United States Patent Office 3,196,152
Patented July 20, 1965

---

3,196,152
PHENYL AND ALKYLENEAMINO SUBSTITUTED IMIDAZOLIDINONES AND SALTS THEREOF
William B. Wright, Jr., Woodcliff Lake, N.J., and Herbert J. Brabander, Pearl River, N.Y., assignors to American Cyanamid Company, Stamford, Conn., a corporation of Maine
No Drawing. Filed Sept. 28, 1962, Ser. No. 227,078
19 Claims. (Cl. 260—247.2)

This is a continuation-in-part of application Serial No. 147,203 filed October 24, 1961, now abandoned.

This invention relates to new organic compounds. More particularly, it relates to substituted imidazolidinones and imidazolidinethiones and methods of preparing the same.

In the prior art, imidazolidinones and imidazolidinethiones are known which have aryl groups on one or both of the nitrogen atoms, however, none have been found which contain an aryl group on one nitrogen and substituted alkylene amine groups on the other nitrogen of the heterocyclic basic ring structure.

We have now found that compounds having the following structure are highly active tranquilizers:

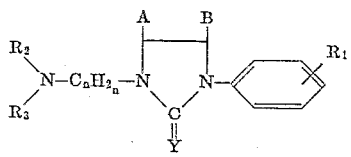

wherein $R_1$ is a hydrogen, halogen, lower alkyl, lower alkoxy, trifluoromethyl, lower alkylthio, lower alkylsulfonyl, lower alkanoyl, hydroxy or aralkoxy group; $R_2$ and $R_3$ are hydrogen, lower alkyl, alkenyl, propargyl, cycloalkyl, aralkyl, or when taken together with the nitrogen form pyrrolidino, lower alkylpyrrolidino, piperidino, lower alkylpiperidino, hexamethyleneimino, morpholino, lower alkylmorpholino, lower alkylpiperazino, hydroxy-lower alkylpiperazino and lower alkanoyloxy-lower alkylpiperazino groups; Y is oxygen or sulfur; $n$ is an integer from 2 to 4 and A and B are hydrogen or lower alkyl groups and the acid addition salts of the above compounds.

The compounds of the present invention are, in general, liquids at room temperature as their free bases. As such, they are relatively insoluble in water but are soluble in or miscible with most organic solvents such as, for example, lower alkyl alcohols, esters, acetone, chloroform and the like. These compounds form acid addition salts with strong acids such as hydrochloric acid, sulfuric acid, perchloric acid and the like. These salts are, in general, soluble in water, methanol, ethanol, etc. but relatively insoluble in benzene, ether, petroleum-ether and the like.

The present compounds have been tested and found to have tranquilizing properties which shown a desirably wide spread between the doses producing sedative action and toxic symptoms such as paralysis or lethality. The tranquilizer meprobamate has a markedly reduced range between the sedative and paralytic doses, and is inferior to the present compounds in this respect.

The compounds of this invention may be prepared by the following method which has been found most desirable.

(1)
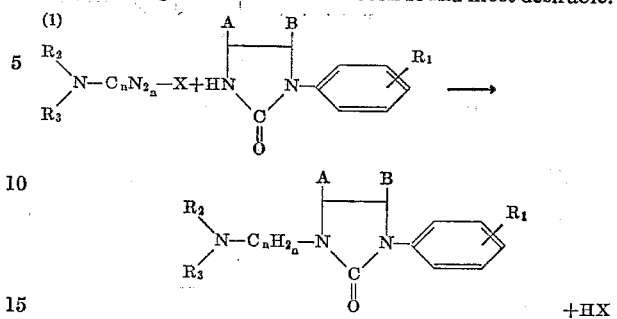

wherein $R_1$, $R_2$, $R_3$, A, B, and $n$ are as defined above and X is a reactive halogen or arylsulfonyloxy radical. The imidazolidinone is dissolved in an inert solvent such as, for example, diethylenegylcol dimethyl ether (diglyme) and reacted with a condensing agent such as sodium hydride and then with an appropriate aminoalkyl halide. The reaction is best carried out at temperatures in the range of 30°–200° C. for a period of from 30 minutes to 4 hours. The product can be recovered by methods well known in the art and described hereinafter in the examples.

The compounds of the present invention can also be prepared by several other methods, one group of which have in common the cyclization of a straight chain compound to produce the desired imidazolidinone ring structure with the substituents present thereon. One method found useful in producing the compounds of the present invention is the cyclization of substituted carbanilates which can be illustrated by the following reaction:

(2)
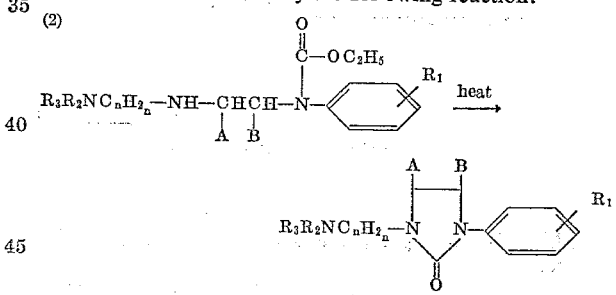

in which $R_1$, $R_2$, $R_3$, A, B and $n$ are as defined above.

The present compounds can also be prepared by the cyclization of N-substituted (aminoalkyl)ureas. This reaction can be illustrated as follows:

(3)
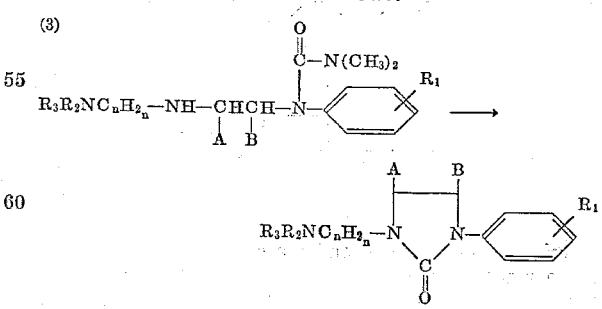

in which $R_1$, $R_2$, $R_3$, A, B and $n$ are defined above. The starting material, namely, N-substituted (aminoalkyl) ureas can be prepared by the various methods described in the literature.

Other methods of preparing the compounds of the present invention can be illustrated as follows:

(4)

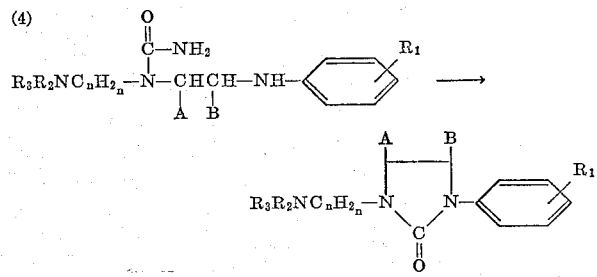

(5)

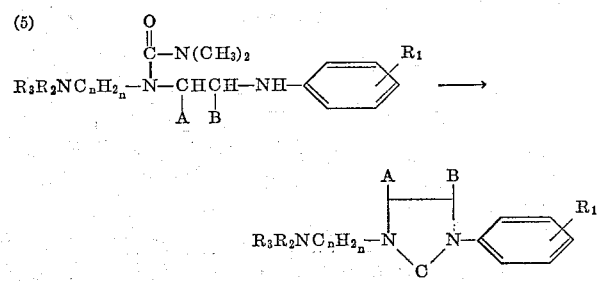

in which $R_1$, $R_2$, $R_3$, A, B and $n$ are as defined above.

The various cyclization reactions illustrated above can be carried out, for example, by heating the reagents alone or in the presence of a solvent inert to the reactants at a temperature within the range of about 100° C. to about 250° C. for a period of from about 30 minutes to about 10 hours.

Further methods of preparing the compounds of the present invention can be used, such as, the reaction of N-substituted aminoalkylene-N'-aryl alkylenediamines with cyclizing agents such as ethyl chloroformate, phosgene, ethyl carbonate and the like. The preparation of the present compounds by this latter method can be illustrated as follows:

(6)

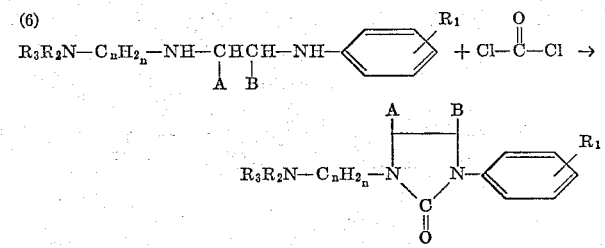

in which $R_1$, $R_2$, $R_3$, A, B and $n$ are as defined hereinbefore.

A still further method for preparing the compounds of the present invention can be illustrated as follows:

(7)

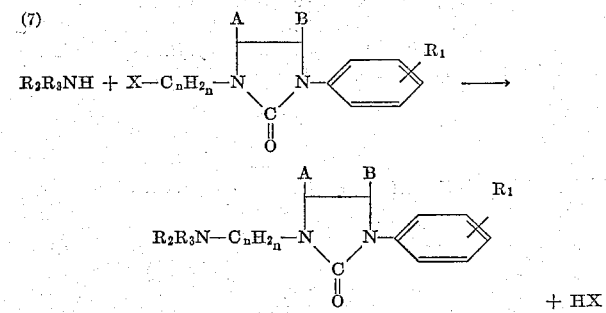

wherein $R_1$, $R_2$, $R_3$, A, B and $n$ are as defined above and X is a reactive halogen or arylsulfonyloxy radical. The reaction conditions do not appear to be critical. The alkylating agent (containing X) is reacted with the amine ($R_2R_3NH$) in excess or in the presence of an acid acceptor such as sodium or potassium carbonate, sodium hydroxide, pyridine and the like. The reaction is preferably carried out in the presence of an excess of the amine or in a solvent such as benzene, toluene, ethanol, acetone and the like. The reaction is best carried out within the range of about 20° C. to about 150° C. for a period from about 30 minutes to several hours. The product can be recovered by methods well known in the art and as described hereinafter in the examples.

The corresponding imidazolidinethiones are also a part of this invention and in some cases they can be prepared by processes similar to those described above. It is, however, preferable to prepare these compounds by special procedures, such as by the reaction of the imidazolidinone with phosphorus pentasulfide as described hereinafter in the examples.

The products of the present invention as tranquilizers can be incorporated in various pharmaceutical forms such as tablets, capsules, pills and so forth, for immediate or sustained release, by combining with suitable carriers. They may be in the form of dosage units for a single therapeutic dose or in small units for multiple dosages or in larger units for division into single doses. Obviously, in addition to the therapeutic tranquilizing compound there may be present excipients, binders, fillers and other therapeutically inert ingredients necessary in the formulation of the desired pharmaceutical preparation.

The following specific examples illustrate the preparation of representative compounds of the present invention. Parts are by weight unless otherwise indicated.

EXAMPLE I

*Preparation of 1-(m-chlorophenyl)-3-(3-dimethylaminopropyl)-2-imidazolidinone hydrochloride*

A solution of 3 parts of 1-(m-chlorophenyl)-2-imidazolidinone in 30 parts of diglyme is added dropwise to a slurry of 0.7 part of 50% sodium hydride (in mineral oil) in 50 parts of diglyme. The reaction mixture is stirred for one hour and a solution of 1.8 parts of 3-dimethylaminopropyl chloride in 20 parts of diglyme is added. The reaction mixture is heated at reflux temperature for 3 hours, cooled, treated with 0.8 part of methanol, and filtered. The mother liquor is concentrated under reduced pressure to remove the solvent and the residue is dissolved in ether. Dry hydrogen chloride gas is bubbled thru the solution and the salt which forms is separated and washed with ether. The salt is recrystallized and the product 1-(m-chlorophenyl)-3-(3-dimethylaminopropyl)-2-imidazolidinone hydrochloride melts at 174–175° C.

EXAMPLE II

*Preparation of 1-(3-dimethylaminopropyl)-3-phenyl-2-imidazolidinone*

A solution of 3 parts of 1-phenyl-2-imidazolidinone in 50 parts of diglyme is added dropwise to a slurry of 0.84 part of 50% sodium hydride (in mineral oil) in 50 parts of diglyme. The reaction mixture is stirred for one hour, and a solution of 2.2 parts of 3-dimethylaminopropyl chloride in 20 ml. of diglyme is added. The reaction mixture is heated at reflux temperature for 3½ hours, cooled and filtered. The mother liquor is concentrated under reduced pressure to remove the solvent and the residue is triturated with hexane. Crystals of unreacted starting material separate and are filtered off. The filtrate is concentrated to an oil. The oil is dissolved in ether and 10 parts of 1.7 N ethanolic hydrogen chloride is added. An oil separates and is washed with ether to remove impurities. Crystallization occurs. The hygroscopic crystals are dissolved in water and treated with aqueous sodium hydroxide. The mixture is extracted with ether. Evaporation of the ether layer results in analytically pure 1-(3-dimethylaminopropyl)-3-phenyl-2-imidazolidinone.

EXAMPLE III

*Preparation of 1-(3-dimethylaminopropyl)-4-methyl-3-phenyl-2-imidazolidinone*

The above compound is obtained when 4-methyl-3-phenyl-2-imidazolidinone is substituted for 1-phenyl-2-imidazolidinone in the procedure described in Example II.

EXAMPLE IV

*Preparation of 3-(3-dimethylaminopropyl)-4-methyl-1-phenyl-2-imidazolidinone*

The above compound is obtained when 4-methyl-1-phenyl-2-imidazolidinone is substituted for 1-phenyl-2-imidazolidinone in the process of Example II.

EXAMPLE V

*Preparation of 1-phenyl-3-(2-piperidinoethyl)-2-imidazolidinone hydrochloride*

A solution of 3 parts of 1-phenyl-2-imidazolidinone in 50 parts of diglyme is added dropwise to a slurry of 0.84 part of 50% sodium hydride (in mineral oil) in 50 parts of diglyme. The reaction mixture is stirred for one hour, and a solution of 2.7 parts of 2-piperidinoethyl chloride in 50 parts of ether is added. The reaction mixture is heated at reflux for 3 hours, cooler, and filtered. The filtrate is concentrated to remove the solvents. The residue is mixed with 7 parts of 5 N hydrochloric acid and 25 parts of water and the mixture is extracted with chloroform to remove unwanted impurities. The aqueous layer is made alkaline and the 1-phenyl-3-(2-piperidinoethyl)-2-imidazolidinone is extracted into ether. Addition of ethanolic hydrogen chloride results in precipitation of the hydrochloride salt, melting point 218–219° C. after recrystallization.

EXAMPLE VI

*Preparation of 1-(p-ethylphenyl)-3-(2-piperidinoethyl)-2-imidazolidinone hydrochloride*

The above compound is obtained when 1-(p-ethylphenyl)-2-imidazolidinone is substituted for 1-phenyl-2-imidazolidinone in the procedure of Example V.

EXAMPLE VII

*Preparation of 1-(2-hexamethyleniminoethyl)-3-phenyl-2-imidazolidinone hydrochloride*

The above compound is obtained when 2-hexamethyleniminoethyl chloride is substituted for 2-piperidinoethyl chloride in the process of Example V.

EXAMPLE VIII

*Preparation of 1-phenyl-3-(2-pyrrolidinoethyl)-2-imidazolidinone hydrochloride*

The above compound is obtained when 2-pyrrolidinoethyl chloride is substituted for 2-piperidinoethyl chloride in the procedure of Example V. The compound has the melting point 220–222° C.

EXAMPLE IX

*Preparation of 1-(m-chlorophenyl)-3-(2-piperidinoethyl)-2-imidazolidinone hydrochloride*

The above compound, melting point 212–214° C. is obtained when 2-piperidinoethyl chloride is substituted for 3-dimethylaminopropyl chloride in the process of Example I.

EXAMPLE X

*Preparation of 1-(2-benzylmethylaminoethyl)-3-(m-chlorophenyl)-2-imidazolidinone hydrochloride*

The above compound, melting point 188–190° C., is obtained when 2-benzylmethylaminoethyl chloride is substituted for 3-dimethylaminopropyl chloride in the process of Example I.

EXAMPLE XI

*Preparation of 1-(m-chlorophenyl)-3-(2-dimethylaminoethyl)-2-imidazolidinone hydrochloride*

The above compound, melting point 217–219° C., is obtained when 2-dimethylaminoethyl chloride is substituted for 3-dimethylaminopropyl chloride in the process of Example I.

EXAMPLE XII

*Preparation of 1-(m-chlorophenyl)-3-[3-(4-methyl-1-piperazinyl)propyl]-2-imidazolidinone dihydrochloride*

The above compound, melting point 277–278° C., is obtained when 3-(4-methyl-1-piperazinyl)propyl chloride is substituted for 3-dimethylaminopropyl chloride in the process of Example I.

EXAMPLE XIII

*Preparation of 1-(2-diethylaminoethyl)-3-(p-ethoxyphenyl)-2-imidazolidinone*

A solution of 3.8 parts of 1-(p-ethoxyphenyl)-2-imidazolidinone in 50 parts of diglyme is added dropwise to a slurry of 0.84 part of 50% sodium hydride (in mineral oil) in 50 parts of diglyme. The reaction mixture is stirred for one hour and a solution of 2.5 parts of 2-diethylaminoethyl chloride in 50 parts of ether is added. The reaction mixture is heated at reflux temperature for 3 hours, cooled and filtered. The filtrate is concentrated to remove the solvents. The residue is mixed with 7 parts of 5 N hydrochloric acid and 25 parts of water and the mixture is extracted with chloroform to remove unwanted impurities. The aqueous layer is made alkaline. The 1-(2-diethylaminoethyl)-3-(p-ethoxyphenyl)-2-imidazolidinone is extracted into ether and isolated by concentration of the ether solution.

EXAMPLE XIV

*Preparation of 1-(m-trifluoromethylphenyl)-3-(2-dimethylaminoethyl)-2-imidazolidinone hydrochloride*

The above compound, melting point 168–170° C., is obtained when 1-(m-trifluoromethylphenyl)-2-imidazolidinone is substituted for 1-phenyl-2-imidazolidinone and 2-dimethylaminoethyl chloride is substituted for 2-piperidinoethyl chloride in the process of Example V.

EXAMPLE XV

*Preparation of 1-[3-(4-methyl-1-piperazinyl)propyl]-3-phenyl-2-imidazolidinone dihydrochloride*

A mixture of 6.2 parts of 1-(m-chlorophenyl)-3-[3-(4-methyl-1-piperazinyl)propyl]-2-imidazolidinone dihydrochloride, 100 parts of 90% ethanol and 1 part of 10% palladium on carbon catalyst is placed in a Parr hydrogenator under about 45 p.s.i. of hydrogen pressure, and shaken for three hours. The reaction mixture is filtered and the mother liquor is concentrated to remove solvents. The residue is triturated with ether and the crystalline product is filtered off. Analytically pure 1-[3-(4-methyl-1-piperazinyl]-3-phenyl-2-imidazolidinone dihydrochloride, melting point 278–280° C., is obtained by recrystallization.

EXAMPLE XVI

*Preparation of 1-(2-methylaminoethyl)-3-phenyl-2-imidazolidinone hydrochloride*

The above compound, melting point 221–223° C., is obtained when 1-(2-benzylmethylaminoethyl)-3-(m-chlorophenyl)-2-imidazolidinone hydrochloride is hydrogenated according to the procedure of Example XV.

EXAMPLE XVII

*Preparation of 1-(2-dimethylaminoethyl)-3-phenyl-2-imidazolidinone hydrochloride*

The above compound, melting point 191°–193° C., is obtained when 1-(m-chlorophenyl)-3-(2-dimethylaminoethyl)-2-imidazolidinone hydrochloride is substituted for 1-(m-chlorophenyl)-3-[3-(4-methyl-1-piperazinyl)-propyl]-2-imidazolidinone dihydrochloride in the process of Example XV.

EXAMPLE XVIII

*Preparation of 1-(2-dimethylaminoethyl)-3-phenyl-2 imidazolidinone hydrochloride*

The above compound, melting point 149°–150° C., is obtained when 1 - (m - chlorophenyl) - 3 - (2 - diethyl-aminoethyl)-2-imidazolidinone hydrochloride is substituted for 1 - (m - chlorophenyl) - 3 - [3 - (4 - methyl - 1-piperazinyl) - propyl] - 2 - imidazolidinone dihydrochloride in the procedure of Example XV.

EXAMPLE XIX

*Preparation of 1-(2-ethylmethylaminoethyl)-3-phenyl-2-imidazolidinone hydrochloride*

When 1 - (m - chlorophenyl) - 3 - (2 - ethylmethyl-aminoethyl) - 2 - imidazolidinone hydrochloride is substituted for 1 - (m - chlorophenyl) - 3 - [3 - (4 - methyl-1 - piperazinyl) - propyl] - 2 - imidazolidinone dihydrochloride in the process of Example XV, the above compound, melting point 163°–164° C., is obtained.

EXAMPLE XX

*Preparation of 1-(m-chlorophenyl)-3-(2-diethylaminoethyl)-2-imidazolidinone hydrochloride*

The above compound, melting point 144°–145° C., is obtained when 2-diethylaminoethyl chloride is substituted for 3-dimethylaminopropyl chloride in the procedure of Example I.

EXAMPLE XXI

*Preparation of 1-(m-chlorophenyl)-3-(2-ethylmethylaminoethyl)-2-imidazolidinone hydrochloride*

The above compound, melting point 172°–174° C., is isolated when 2-ethylmethylaminoethyl chloride is substituted for the 3-dimethylaminopropyl chloride in the process of Example I.

EXAMPLE XXII

*Preparation of 1-(m-chlorophenyl)-3-(2-pyrrolidinoethyl)-2-imidazolidinone hydrochloride*

When 2-pyrrolidinoethyl chloride is substituted for 3-dimethylaminopropyl chloride in the process of Example I, the above compound, melting point 191°–192° C., is isolated.

EXAMPLE XXIII

*Preparation of 1-(m-chlorophenyl)-3-[2-(2-methyl-pyrrolidino)ethyl]-2-imidazolidinone hydrochloride*

The above compound is obtained when 2-(2-methyl-pyrrolidino)ethyl chloride is substituted for 3-dimethylaminopropyl chloride in the process of Example I.

EXAMPLE XXIV

*Preparation of 1-(m-chlorophenyl)-3-[2-(2-methyl-piperidino)ethyl]-2-imidazolidinone hydrochloride*

The above compound is obtained when 2-(2-methyl-piperidino)ethyl chloride is substituted for 3-dimethylaminopropyl chloride in the procedure of Example I.

EXAMPLE XXV

*Preparation of 1-(m-chlorophenyl)-3-(2-morpholinoethyl)-2-imidazolidinone hydrochloride*

When 2-morpholinoethyl chloride is substituted for the 3-dimethylaminopropyl chloride in the procedure of Example I, the above compound, melting point 219°–221° C., is obtained.

EXAMPLE XXVI

*Preparation of 1-(p-chlorophenyl)-3-(3-dimethylaminopropyl)-2-imidazolidinone hydrochloride*

When 1-(p-chlorophenyl)-2-imidazolidinone is substituted for the 1-(m-chlorophenyl)-2-imidazolidinone in the procedure of Example I, the above compound, melting point 177–178° C., is obtained.

EXAMPLE XXVII

*Preparation of 1-(m-bromophenyl)-3-(3-dimethylaminopropyl)-2-imidazolidinone hydrochloride*

The above compound, melting point 168°–169° C., is obtained when 1-(m-bromophenyl)-2-imidazolidinone is substituted for 1-(m-chlorophenyl)-2-imidazolidinone in the procedure of Example I.

EXAMPLE XXVIII

*Preparation of 1-(m-methylthiophenyl)-3-(dimethyl-aminopropyl)-2-imidazolidinone hydrochloride*

The above compound, melting point 144°–146° C., is obtained when 1-(methylthiophenyl)-2-imidazolidinone is substituted for the 1-(m-chlorophenyl)-2-imidazolidinone in the procedure of Example I.

EXAMPLE XXIX

*Preparation of 1-(3-dimethylaminopropyl)-3-(m-trifluoromethylphenyl)-2-imidazolidinone hydrochloride*

The above compound, melting point 155°–157° C., is obtained when 1 -(m - trifluoromethylphenyl)-2-imidazolidinone is substituted for 1-(m-chlorophenyl)-2-imidazolidinone in the procedure of Example I.

EXAMPLE XXX

*Preparation of 1-(3-[4-(2-acetoxyethyl)piperazino]-propyl)-3-(m-chlorophenyl)-2-imidazolidinone*

A solution of 3 parts of 1-(m-chlorophenyl)-2-imidazolidinone in 30 parts of diglyme is added dropwise to a slurry of 0.7 part of 50% sodium hydride (in mineral oil) in 50 parts of diglyme. The reaction mixture is stirred for one hour and a solution of 3.5 parts of 3-[4-(2-acetoxyethyl)piperazino]propyl chloride in 20 parts of diglyme is added. The reaction mixture is heated at reflux temperature for 3 hours and then concentrated to remove the solvent. The residue is treated with dilute hydrochloric acid and the aqueous mixture is extracted with ether to remove unreacted starting material. The aqueous layer is cooled in an ice bath, made basic by addition of dilute sodium hydroxide solution and extracted with chloroform. The desired compound is obtained by concentration of the chloroform layers.

EXAMPLE XXXI

*Preparation of 1-(m-chlorophenyl)-3-(3-[4-(2-hydroxyethyl)piperazino]propyl)-2-imidazolidinone*

A mixture of 1 part of 1-(3-[4-(2-acetoxyethyl)piperazino]propyl)-3-(m-chlorophenyl)-2-imidazolidinone and 10 parts of 2 N ethanolic sodium hydroxide is heated at reflux temperature for 2 hours and concentrated. The residue is diluted wtih 10 parts of water and extracted with chloroform. The desired product is obtained when the chloroform layer is concentrated.

EXAMPLE XXXII

*Preparation of 1-(m-chlorophenyl)-3-(4-dimethylaminobutyl)-2-imidazolidinone hydrochloride*

The above compound is obtained when 4-dimethyl-aminobutyl chloride is substituted for the 3-dimethyl-aminopropyl chloride in the procedure of Example I.

EXAMPLE XXXIII
*Preparation of 1-(m-chlorophenyl)-3-(2-propargylmethylaminoethyl)-2-imidazolidinone hydrochloride*

The above compound is obtained when 2-propargylmethylaminoethyl chloride is substituted for 3-dimethylaminopropyl chloride in the process of Example I.

EXAMPLE XXXIV
*Preparation of 1-(2-allylmethylaminoethyl)-3-(m-chlorophenyl)-2-imidazolidinone hydrochloride*

The above compound is obtained when 2-allylmethylaminoethyl chloride is substituted for 3-dimethylaminopropyl chloride in the process of Example I.

EXAMPLE XXXV
*Preparation of 1-(m-chlorophenyl)-3-(2-cyclohexylmethylaminoethyl)-2-imidazolidinone hydrochloride*

The above compound is obtained when 2-cyclohexylmethylaminoethyl chloride is substituted for 3-dimethylaminopropyl chloride in the process of Example I.

EXAMPLE XXXVI
*Preparation of 1-(m-acetylphenyl)-3-(3-dimethylaminopropyl)-2-imidazolidinone hydrochloride*

The above compound is obtained when 1-(m-acetylphenyl)-2-imidazolidinone is substituted for the 1-(m-chlorophenyl)-2-imidazolidinone in the process of Example I.

EXAMPLE XXXVII
*Preparation of 1-(m-bromophenyl)-3-(2-dimethylaminoethyl)-2-imidazolidinone hydrochloride*

A solution of 6.8 parts of 1-(m-bromophenyl)-2-imidazolidinone in 50 ml. of diglyme is added dropwise to a slurry of 1.6 parts of 50% sodium hydride (in mineral oil) in 50 parts of diglyme. The reaction mixture is stirred for one hour and a solution of 3.8 parts of 2-dimethylaminoethyl chloride in 150 parts of ether is added. The reaction mixture is stirred for one hour at room temperature, heated to remove the ether and heated at reflux temperature for 3 hours. The reaction mixture is filtered and the mother liquor is concentrated to remove the solvent. The residue is triturated with 1 N hydrochloric acid and the mixture is extracted with ether to remove unreacted starting material. The acid solution is made alkaline by addition of 5 N sodium hydroxide solution and then extracted with ether. The ether extracts are dried over magnesium sulfate and then treated with ethanolic hydrogen chloride. The 1-(m-bromophenyl)-3-(2-dimethylaminoethyl)-2-imidazolidinone hydrochloride separates. It melts at 227°–229° C. after recrystallization.

EXAMPLE XXXVIII
*Preparation of 1-(2-dimethylaminoethyl)-3-(m-tolyl)-2-imidazolidinone hydrochloride*

The above compound, melting point 214°–215° C., is obtained when 1-(m-tolyl)-2-imidazolidinone is substituted for 1-(m-bromophenyl)-2-imidazolidinone in the process of Example XXXVII.

EXAMPLE XXXIX
*Preparation of 1-(p-chlorophenyl)-3-(2-dimethylaminoethyl)-2-imidazolidinone hydrochloride*

The above compound, melting point 211°–212° C., is obtained when 1-(p-chlorophenyl)-2-imidazolidinone is substituted for 1-(m-bromophenyl)-2-imidazolidinone in the process of Example XXXVII.

EXAMPLE XL
*Preparation of 1-(m-methoxyphenyl)-3-(2-dimethylaminoethyl)-2-imidazolidinone hydrochloride*

When 1-(m-methoxyphenyl)-2-imidazolidinone is substituted for 1-(m-bromophenyl)-2-imidazolidinone in the process of Example XXXVII, the above compound, melting point 220°–222° C., is obtained.

EXAMPLE XLI
*Preparation of 1-(2-dimethylaminoethyl)-3-(m-methylthiophenyl)-2-imidazolidinone hydrochloride*

The above compound, melting point 148°–150° C., is obtained when 1-(m-methylthiophenyl)-2-imidazolidinone is substituted for 1-(m-bromophenyl)-2-imidazolidinone in the process of Example XXXVII.

EXAMPLE XLII
*Preparation of 1-(m-benzyloxyphenyl)-3-(2-dimethylaminoethyl)-2-imidazolidinone hydrochloride*

The above compound is obtained when 1-(m-benzyloxyphenyl)-2-imidazolidinone is substituted for 1-(m-bromophenyl)-2-imidazolidinone in the process of Example XXXVII.

EXAMPLE XLIII
*Preparation of 1-(3-dimethylaminopropyl)-3-(m-methylsulfonylphenyl)-2-imidazolidinone hydrochloride*

A mixture of 1.65 parts of 1-(3-dimethylaminopropyl)-3-(m-methylthiophenyl)-2-imidazolidinone, 1.3 parts of 30% hydrogen peroxide and 6 parts of acetic acid is heated in a steam bath for 2½ hours, cooled and treated with 23 parts of 5 N sodium hydroxide solution. The reaction mixture is extracted with chloroform and the chloroform layer is washed with water and then concentrated to remove the solvent. The residue is dissolved in 3 parts of ethanol and 2.5 parts of 1.8 N ethanolic hydrogen chloride is added. The mixture is cooled and the desired product is filtered and further purified by recrystallization from ethanol.

EXAMPLE XLIV
*Preparation of 1-(m-hydroxyphenyl)-3-(2-dimethylaminoethyl)-2-imidazolidinone hydrochloride*

A mixture of 1 part of 1-(m-methoxyphenyl)-3-(2-dimethylaminoethyl)-2-imidazolidinone hydrochloride, 20 parts of 48% hydrobromic acid and 20 parts of acetic acid is heated at reflux temperature for 72 hours and then diluted with 75 parts of water. The reaction mixture is made alkaline with potassium carbonate and extracted with chloroform. The chloroform solution is concentrated to a red oil, which is dissolved in ethanol and treated with 2.2 parts of 1.8 N ethanolic hydrogen chloride and then with ether. The crystalline product is filtered and recrystallized from ethanol by addition of ether.

EXAMPLE XLV
*Preparation of 1-(m-iodophenyl)-3-(2-dimethylaminoethyl)-2-imidazolidinone hydrochloride*

The above compound is obtained when 1-(m-iodophenyl)-2-imidazolidinone is substituted for 1-(m-bromophenyl)-2-imidazolidinone in the procedure of Example XXXVII.

EXAMPLE XLVI
*Preparation of 1-(m-chlorophenyl)-3-[2-(3,5-dimethylmorpholino)ethyl]-2-imidazolidinone hydrochloride*

The above compound is obtained when 2-(3,5-dimethylmorpholino)ethyl chloride is substituted for 3-dimethylaminopropyl chloride in the procedure of Example I.

EXAMPLE XLVII
*Preparation of 1-(m-chlorophenyl)-3-(2-pyrrolidinoethyl)-2-imidazolidinethione*

A mixture of 3 parts of 1-(m-chlorophenyl)-3-(2-pyrrolidinoethyl)-2-imidazolidinone hydrochloride, 3 parts of phosphorus pentasulfide and 15 parts of xylene is heated at reflux temperature for 28 hours. A mixture of 50 parts of 2 N sodium hydroxide and 50 parts of benzene is added and the mixture is warmed and triturated until the product dissolves in the organic layer. The organic layer is washed with water and concentrated to remove the solvent. The residue is mixed with 30 parts of 1 N hydrochloric acid and the mixture is filtered. The mother liquor is made basic with 10 parts of 5 N sodium hydroxide and extracted with ether. When the ether layer is concentrated, 1-(m-chlorophenyl)-3-pyrrolidinoethyl)-2-imidazolidinethione is obtained, melting point 76–78° C.

EXAMPLE XLVIII

*Preparation of 1-(m-chlorophenyl)-3-(2-diethylaminoethyl)-2-imidazolidinethione*

The above compound is obtained when 1-(m-chlorophenyl)-3-(2-diethylaminoethyl)-2-imidazolidinone hydrochloride is substituted for 1-(m-chlorophenyl)-3-(2-pyrrolidinoethyl)-2-imidazolidinone in the process of Example XLVII.

1. A compound of the formula:

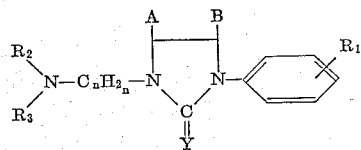

wherein $R_1$ is a member of the group consisting of hydrogen, halogen, lower alkyl, lower alkoxy, trifluoromethyl, lower alkylthio, lower alkylsulfonyl, lower alkanoyl, hydroxy and benzyloxy groups; $R_2$ and $R_3$ are members of the group consisting of hydrogen, lower alkyl, lower alkenyl, propargyl, cycloalkyl less than 7 carbons and phenyl (lower)alkyl and when taken together with the nitrogen form pyrrolidino, lower alkylpyrrolidino, piperidino, lower alkylpiperidino, hexamethyleneimino, morpholino, lower alkylmorpholino, lower alkylpiperazino, hydroxy-lower alkylpiperazino and lower alkanoyloxy-lower alkylpiperazino groups; Y is a member of the group consisting of oxygen and sulfur; $n$ is an integer from 2 to 4 and A and B are member of the group consisting of hydrogen and lower alkyl groups and therapeutically useful salts thereof.

2. A compound according to claim 1 wherein $R_1$ is halogen, $R_2$ and $R_3$ are lower alkyl, A and B are hydrogen and $n$ is 2.

3. A compound according to claim 1 wherein $R_1$ is halogen

is pyrrolidino and A and B are hydrogen.

4. The compound 1-(-chlorophenyl)-3-(2-dimethylaminoethyl)-2-imidazolidinone.
5. The compound -1(m-chlorophenyl)-3-(2-ethylmethylaminoethyl)-2-imidazolidinone.
6. The compound 1-(m-chlorophenyl)-3-(2-pyrrolidinoethyl)-2-imidazolidinone.
7. The compound 1-phenyl-3-(2-piperidinoethyl)-2-imidazolidinone.
8. The compound 1-(m-chlorophenyl)-3-(2-piperidinoethyl)-2-imidazolidinone.
9. The compound 1-(2-benzylmethylaminoethyl)-3-(m-chlorophenyl)-2-imidazolidinone.
10. The compound 1-(2-pyrrolidinoethyl)-3-phenyl-2-imidazolidinone.
11. The compound 1-(2-ethylmethylaminoethyl)-3-phenyl-2-imidazolidinone.
12. The compound 1-(m-chlorophenyl)-3-(2-diethylaminoethyl)-2-imidazolidinone.
13. The compound 1-phenyl-3-(2-dimethylaminoethyl)-2-imidazolidinone.
14. The compound 1-(m-chlorophenyl)-3-(3-dimethylaminopropyl)-2-imidazolidinone.
15. The compound 1-(2-diethylaminoethyl)-3-phenyl-2-imidazolidinone.
16. The compound 1-(m-chlorophenyl)-3-(2-morpholinoethyl)-2-imidazolidinone.
17. The compound 1-(m-bromophenyl)-3-(2-dimethylaminoethyl)-2-imidazolidinone.
18. The compound 1-(m-chlorophenyl)-3-(2-pyrrolidinoethyl)-2-imidazolidinethione.
19. The compound 1-(m-chlorophenyl)-3-(2-diethylaminoethyl)-2-imidazolidinethione.

References Cited by the Examiner

Elderfield, Heterocyclic Compounds, vol. 5, page 261, John Wiley and Sons, Inc., New York (1957).

Hofmann, The Chemistry of Heterocyclic Compounds, Imidazole and Its Derivatives, part 1, pp. 226–227, Interscience Publishers, Inc., New York (1953).

NICHOLAS S. RIZZO, *Primary Examiner.*

I. MARCUS, *Examiner.*